United States Patent [19]

Factor et al.

[11] Patent Number: 5,077,187
[45] Date of Patent: Dec. 31, 1991

[54] PHOTOGRAPHIC ELEMENTS SILVER HALIDE CONTAINING A SPECIFIC POLYMER AND WATER SOLUBLE DYE LAYER

[75] Inventors: Ronda E. Factor, Rochester; Ignazio S. Ponticello, Pittsford, both of N.Y.

[73] Assignee: Eastman Kodak Company, Rochester, N.Y.

[21] Appl. No.: 592,765

[22] Filed: Oct. 4, 1990

Related U.S. Application Data

[63] Continuation-in-part of Ser. No. 437,002, Nov. 15, 1989, abandoned, and a continuation of Ser. No. 437,003, Nov. 15, 1989, Pat. No. 5,006,450.

[51] Int. Cl.$^5$ .............................. G03C 1/76
[52] U.S. Cl. ...................... 430/536; 430/518; 430/523; 526/263; 526/292.3; 526/292.9
[58] Field of Search ............ 430/518, 536, 523; 526/263, 292.3, 292.9

[56] References Cited

U.S. PATENT DOCUMENTS

| | | | |
|---|---|---|---|
| 1,939,171 | 12/1933 | Hickman | 95/9 |
| 1,994,876 | 3/1935 | Schneider et al. | 95/9 |
| 2,036,546 | 4/1936 | Schneider | 95/81 |
| 3,748,129 | 7/1973 | Autges et al. | 96/3 |
| 4,379,838 | 4/1983 | Helling et al. | 430/537 |
| 4,533,621 | 8/1985 | Ikeuchi et al. | 430/518 |
| 4,600,687 | 7/1986 | Nakamura et al. | 430/518 |

FOREIGN PATENT DOCUMENTS 127787 12/2984 European Pat. Off. .

*Primary Examiner*—Jack P. Brammer
*Attorney, Agent, or Firm*—Paul A. Leipold

[57] ABSTRACT

Polymers comprising recurring units represented by the structure:

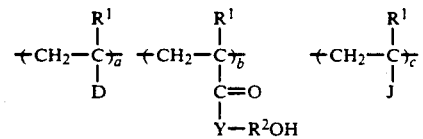

where $R^1$, $R^2$, D, J, Y, a, b, and c are as defined herein are useful for controlling wandering of filter dyes in photographic elements.

1 Claim, No Drawings

PHOTOGRAPHIC ELEMENTS SILVER HALIDE CONTAINING A SPECIFIC POLYMER AND WATER SOLUBLE DYE LAYER

CROSS REFERENCE TO RELATED APPLICATIONS

This is a continuation-in-part of our earlier filed applications Ser. Nos. 437,002 now abandoned and 437,003, both filed on Nov. 15, 1989, now U.S. Pat. No. 5,006,450.

FIELD OF THE INVENTION

This invention relates to mordant polymers and their use in photographic elements.

BACKGROUND OF THE INVENTION

The use of filter dyes in photographic elements for the absorption of unwanted radiation is known.

Filter dyes may be located in several locations in an element. They may be in a radiation-sensitive layer, in an overcoat layer, in a layer adjacent to the radiation-sensitive layer, in an interlayer in a multilayer element, in an undercoat layer adjacent to the support or in a backing layer on the side of the support opposite the radiation-sensitive layer.

Filter dyes that function primarily to absorb unwanted radiation due to reflection or refraction from layer interfaces, the layer-support interface, and particularly from the back side of the support, are referred to as antihalation dyes. The layers that contain them are referred to as antihalation layers.

It is usually important that the dye not migrate from the layer in which it is incorporated during or after coating. It is almost always important that the dye be easily and completely bleached or otherwise removed from the element during processing, and not be regenerated. This requirement is important since residual dye in the coating is a source of objectionable stain.

Mordants are often used to prevent filter dyes from wandering to other layers. Mordants, however, work against the aim of shortening processing times and elimination of dye stain. Polymers that are effective in preventing dyes from wandering but release dyes during processing are highly desirable.

SUMMARY OF THE INVENTION

The present invention provides polymers that form layers for controlling dye diffusion in photographic elements. The polymers may be used with gelatin. They are permeable to alkaline solutions thereby permitting dyes to be rapidly and completely removed from overcoated emulsion or antihalation layers during photographic processing.

The polymers have recurring units represented by the structure:

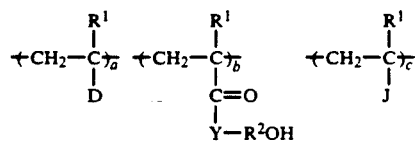

D represents a substituted or unsubstituted heterocyclic group containing an amine acid addition salt component; or D may represent;

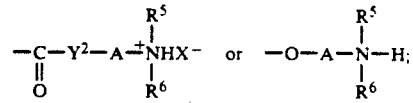

$R^1$ represents H or $CH_3$;
$R^2$ represents alkylene of 2 to 6 carbon atoms;
J represents aryl or $-COY^1R^3$;
Y and $Y^1$, each independently, represents O or $NR^4$;
X represents $Cl^-$, $Br^-$,

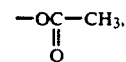

$NO_3^-$, $HSO_4^-$, or $ClO_4^-$;
$R^3$ and $R^4$, each independently, represents H or alkyl of 1 to 10 carbon atoms;
a is 5 to 65 weight percent;
b is 5 to 99 weight percent; and
c is 1 to 65 weight percent;
$R^5$ and $R^6$, each independently, represents H, alkyl of 1 to 20 carbons, cycloalkyl of 3 to 8 carbons, aryl, of 6 to 20 carbons or aralkyl of 6 to 20 carbon atoms; or $R^5$ or $R^6$ taken together with A represent the elements needed to complete a five or six membered ring;
$Y^2$ represents O or NH;
A represents a divalent radical of 1 to 20 carbon atoms;
provided that when $Y^2$ is NH, c is greater than 45 up to about 50 weight percent.

The above provision helps to prevent dye from wandering during coating, yet allow complete washout during processing.

DESCRIPTION OF THE PREFERRED EMBODIMENTS

The polymers are useful in all photographic elements, and especially in elements such as x-ray films, microfilms, and color reversal films where dyes must be retained during coating, yet completely removed during processing.

DETAILS OF THE INVENTION

The polymers of this invention must be miscible with gelatin and are used as a separate layer, coated between a filter dye-containing layer and the light-sensitive emulsion, in a photographic element. The separate layer is sometimes referred to herein as a diffusion control layer, in which the role of the polymer is to form a matrix to control dye diffusion. The other gelatin layers, including the emulsion layer, are coated over the diffusion control layer. On processing, the polymers, being permeable to alkaline solutions, permit easy access of the processing solution to the selected filter dyes. The polymers of this invention have superior properties for use as barrier layers because of the presence of the hydrophobic groups styryl, methacrylate, acrylate, methacrylamide, or acrylamide. These barrier layers are not compatible with dye and, therefore, materials in such a layer are less likely to react with dyes moving into the layer during film forming. The polymers of copending and coassigned application Ser. No. 437,003 filed Nov. 15, 1989 do not act as barriers, but are compatible with dye in a layer of a similar polymer not containing this hydrophobic group.

The polymers must comprise at least 5 weight percent of a repeating unit derived from a monomer which will be protonated at coating pH (about 6) but deprotonates at processing pH (10–12). This requirement insures that the polymers of the invention will be permeable to alkaline solutions having a pH of 10 or above. Monomers which respond to these requirements include amonoalkyl acrylates or aminoalkylacrylamides and monomers derived from vinyl pyridinium and vinyl imidazolium salts or other vinyl heteronitrogen onium salts. Representative monomers are illustrated generally by structures I to VII below. The invention is not limited to these, however.

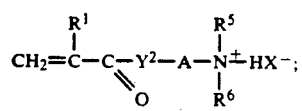 (I)

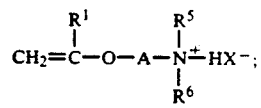 (II)

 (III)

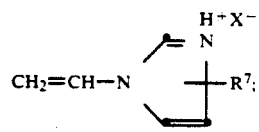 (IV)

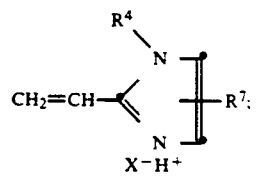 (V)

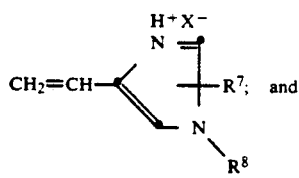 (VI)

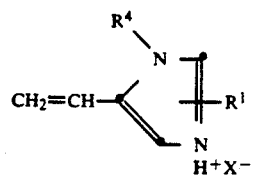 (VII)

$R^1$, $Y^2$, A, and X are as defined above;

$R^5$ and $R^6$, each independently, represent H, alkyl of 1 to 20 carbons, cycloalkyl of 3 to 8 carbons, or aryl of 6 to 20 carbons or aralkyl of 6 to 20 carbon atoms; or $R^5$ or $R^6$ taken together with A represent the atoms needed to complete a five or six membered ring;

$R^7$ represents H, alkyl of 1 to 20 carbons atoms, cycloalkyl of 3 to 8 carbon atoms, aryl of 6 to 20 carbon atoms, or aralkyl 6 to 20 carbon atoms;

$R^8$ represents alkylene or hydroxyalkylene of 2 to 6 carbon atoms; and

G represents the atoms necessary to complete a pyridine ring.

Monomeric examples of structure I include 2-aminoethyl methacrylate HCl, 3-aminopropylmethacrylamide HCl, etc.

Monomeric examples of structure II include 2-aminoethyl vinyl ether, 2-aminoethylstrylether, etc.

Monomeric examples of structure III include 4-vinylpyridine; 2-vinylpyridine, 2-methyl-5-vinylpyridine, etc.

Monomeric examples of structure IV include N-vinyl imidazole, 2-methyl-N-vinylimidazole, 2-phenyl-N-vinylamidazole, etc.

Monomeric examples of structure V include N-alkyl-2-vinylimidazoles wherein alkyl is ethyl, methyl, propyl, butyl, etc.

Monomeric examples of structure VI include N-alkyl-4-vinylimidazole wherein alkyl is ethyl, methyl, propyl, butyl, etc.

Monomeric examples of structure VII include N-alkyl-5-vinylimidazole wherein alkyl is ethyl, methyl, propyl, butyl, etc.

The polymers of the invention can include 0.0 to 90 weight percent of recurring units derived from polymers having the structure

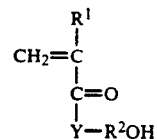

wherein Y, $R^1$ and $R^2$ are as previously designated.

Example of monomers of the structure include 2-hydroxyethyl methacrylate, 2-hydroxyethyl acrylate, 2-hydroxypropyl acrylate, and 2-hydroxypropyl methacrylate. Recurring units derived from these monomers provide the polymer with hydrophilicity and swellability.

The polymers of this invention must also include from 1 to 65 weight percent recurring units derived from monomers having the structure

wherein $R^1$ and J are as previously defined.

Examples of monomers included within this structure are ethyl acrylate, methyl acrylate, 2-ethylhexyl acrylate, octyl acrylate, methyl methacrylate, ethyl methacrylate, 2-ethylhexyl methacrylate, octyl methacrylate, styrene, etc. This monomer provides the polymer with hydrophobicity.

The exact composition of the polymers used will vary according to the element into which they are to be incorporated, the nature of the processing conditions, and to the dye(s) to be used. The optimum ratio of components can be determined by one skilled in the art of polymers and in film building. The molecular weight of the polymers is preferably between $1 \times 10^4$ and $5 \times 10^6$, as determined by the light-scattering method.

The polymers of the invention are useful in controlling diffusion of water-soluble dyes in photographic elements. Such dyes include acidic mono-, tri-, and pentamethine oxonols, merocyanines (carbo and dicarbo), tetrazines, and barbituric acids. Examples of soluble dyes requiring mordants to prevent unwanted migration are known in the art, as described, for example, in U.S. Pat. No. 3,795,519, the disclosure of which is incorporated herein by reference.

The polymers are prepared by methods known in the art as illustrated in Example 1.

EXAMPLE 1

Preparation of Poly(n-butyl methacrylate-co-2-aminoethyl methacrylate hydrochloride-co-methacrylic acid)

A mixture of n-butyl methacrylate (100.0 g, 0.7 moles), 2-aminoethyl methacrylate hydrochloride (60.0 g, 0.35 moles), methacrylic acid (40.0 g, 0.47 moles) and 2,2'-azobis[2-methylpropionitrile] (2.0 g) in ethanol (500 ml) and water (50 ml) was maintained under a nitrogen atmosphere and heated at 70° C. in a constant temperature water bath for 20 hours. Water (1.5 l) was slowly added to the polymer solution over 1 hour in a constant temperature water bath at 70° C. The polymer solution was purified by diafiltration (10 passes) with 20,000 molecular weight cut-off polysulfone membrane to give a solution of 10.9% solids (170 g). Yield 85%. The polymer had a 2-aminoethyl methacrylate hydrochloride content of 28.0%. (theo. 30%). The polymer had an inherent viscosity of 0.34 in 0.1N sodium chloride solution.

The following polymers were prepared in the same manner.

| Polymer No. | (weight ratio) |
| --- | --- |
| 1 | Poly(n-butyl methacrylate-co-2-aminoethyl methacrylate-hydrochloride-co-2-hydroxyethyl methacrylate (50/15/35) |
| 2 | Poly(n-butyl methacrylate-co-3-aminopropyl methacrylamide hydrochloride-co-2-hydroxyethyl methacrylate (50/30/20) |
| 3 | Poly(n-butyl methacrylate-co-2-dimethylaminoethyl methacrylate-co-2-hydroxyethyl methacrylate (15/51/34) |
| 4 | poly(n-butyl methacrylate-co-3-dimethylaminopropyl methacrylamide-co-2-hydroxyethyl methacrylate (35/39/26) |

EXAMPLE 2

Evaluation of Polymer Compositions in a Layer Over a Filter Dye Layer for Control of Dye Diffusion Dyes used in the filter layers of this and the following examples are identified by structures 1 and 2 below.

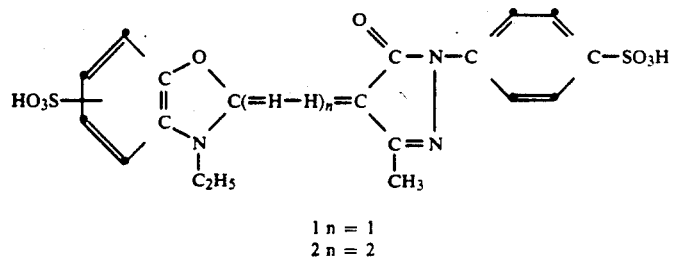

1 n = 1
2 n = 2

Two filter dye coatings were prepared. One coating included the above dye in which n=1; the second coating was with the same dye in which n=2. The coating provided for gelatin coverage of 1.6 gm/m$^2$, a dye level of 0.11 gm/m$^2$, a surfactant level of 0.081 gm/m$^2$ and a hardener level of 0.016 gm/m$^2$. Each filter dye coating was divided into five separate samples. Different polymer compositions were coated over the five separate samples of each filter dye coating to achieve a polymer coverage of 1.1 gm/m$^2$, surfactant level of 0.086 gm/m$^2$ and a hardener level of 0.011 gm/m$^2$.

Each coating was on a polyethylene terephthalate support made from an aqueous solution of the polymer, surfactant and hardener.

The absorption maximum and optical density of each sample was determined in a spectrophotometer before any processing. A portion of each sample was then given a distilled water wash for five minutes and dried. The optical density of the sample was determined again. Each sample of each coating were subjected to photographic processing. A portion of the sample was subjected to the conditions of photographic processing in the Kodak Prostar® processor. A portion was subjected to the conditions of Kodak E-6® processing. The optical density of the dye in each of the processed coating strips was determined again.

Tables I and II describe the results of the evaluations described.

TABLE I

| Polymer No. | Initial Dmax | After 5' Wash | Dmax After Prostar® | Dmax After E-6 |
| --- | --- | --- | --- | --- |
| 1 | 0.98 | 0.96 | 0.03 | 0.04 |
| 2 | 1.05 | 0.99 | 0.12 | 0.03 |
| 3 | 0.84 | 0.99 | 0.04 | 0.03 |
| 4 | 1.08 | 1.09 | 0.50 | 0.04 |
| Gelatin Only | 0.92 | 0.14 | 0.02 | 0.02 |

The results of the other set of coatings with Dye 2 (n=2) in the filter layer are described in Table II.

TABLE II

| Polymer No. | Initial Dmax | After 5' Wash | Dmax After Prostar® | Dmax After E-6 |
| --- | --- | --- | --- | --- |
| 1 | 1.30 | 1.22 | 0.04 | 0.03 |
| 2 | 1.38 | 1.41 | 0.19 | 0.04 |
| 3 | 1.35 | 1.35 | 0.04 | 0.03 |
| 4 | 1.64 | 1.51 | 0.38 | 0.03 |
| Gel | 1.00 | 0.14 | 0.02 | 0.02 |

TABLE II-continued

| Polymer No. | Initial Dmax | After 5' Wash | Dmax After Prostar® | Dmax After E-6 |
|---|---|---|---|---|
| Only | | | | |

Tables I and II show that the polymers of the invention are effective in preventing dye washout at coating pH. The polymers are also effective in permitting complete removal of the dye during photographic processing.

The photographic elements in which the polymers of this invention are useful are black and white, single color, and multicolor photographic elements in which filter layers are used. The polymer is preferably present in an amount of about 0.5 to 10 g/m$^2$.

Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer, e.g., as by the use of microvessels as described in Whitmore U.S. Pat. No. 4,362,806, issued Dec. 7, 1982.

A typical multicolor photographic element would comprise a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler and a yellow dye image-forming unit comprising at least one blue-sensitive silver halide emulsion layer having associated therewith at least one yellow dye-forming coupler. The element can contain additional layers, filter layers, interlayers, overcoat layers, subbing layers, and the like.

In the following discussion of suitable materials for use in the emulsions and elements of this invention, reference will be made to *Research Disclosure*, December 1978, Item 17643, published by Kenneth Mason Publications, Ltd., The Old Harbourmaster's, 8 North Street, Emsworth, Hampshire P010 7DD, ENGLAND, the disclosures of which are incorporated herein by reference. This publication will be identified hereafter by the term "*Research Disclosure*".

The silver halide emulsions employed can be either negative-working or positive-working. Suitable emulsions and their preparation are described in *Research Disclosure* Sections I and II and the publications cited therein. Suitable vehicles for the emulsion layers and other layers are described in *Research Disclosure* Section IX and the publications cited therein.

In addition to the couplers the elements can include additional couplers as described in *Research Disclosure* Section VII, paragraphs D, E, F and G and the publications cited therein. These couplers can be incorporated in the elements and emulsions as described in *Research Disclosure* Section VII, paragraph C and the publications cited therein.

The photographic elements or individual layers thereof, can contain brighteners (see Research Disclosure Section V), antifoggants and stabilizers (see *Research Disclosure* Section VI), antistain agents and image dye stabilizer (see *Research Disclosure* Section VII, paragraphs I and J), light absorbing and scattering materials (see *Research Disclosure* Section VIII), hardeners (see *Research Disclosure* Section XI), plasticizers and lubricants (see *Research Disclosure* Section XII), antistatic agents (see *Research Disclosure* Section XIII), matting agents (see *Research Disclosure* Section XVI) and development modifiers (see *Research Disclosure* Section XXI).

The photographic elements can be coated on a variety of supports as described in *Research Disclosure* Section XVII and the references described therein.

Photographic elements can be exposed to actinic radiation, typically in the visible region of the spectrum, to form a latent image as described in *Research Disclosure* Section XVIII and then processed to form a visible dye image as described in *Research Disclosure* Section XIX. Processing to form a visible dye image includes the step of contacting the element with a color developing agent to reduce developable silver halide and oxidize the color developing agent. Oxidized color developing agent in turn reacts with the coupler to yield a dye.

The invention has been described in detail with particular reference to preferred embodiments thereof, but it will be understood that variations and modifications can be effected within the spirit and scope of the invention.

We claim:

1. A photographic element comprising a support, a radiation-sensitive silver halide layer, a layer comprising a water-soluble dye and, between the silver halide layer and the dye layer, a layer comprising a polymer is selected from the group consisting of poly(n-butyl methacrylate-co-2-aminoethyl methacrylate-hydrochloride-co-2-hydroxyethyl methacrylate (50/15/35);

poly(n-butyl methacrylate-co-3-aminopropyl methacrylamide hydrochloride-co-2-hydroxy-ethyl methacrylate (50/30/20);

poly(n-butyl methacrylate-co-2-dimethyl-aminoethyl methacrylate-co-hydroxyethyl methacrylate (15/51/34); and poly(n-butyl methacrylate-co-3-dimethyl-propyl methacrylamide-co-2-hydroxyethyl methacrylate (35/39/26).

* * * * *